United States Patent
Rodrigues et al.

(10) Patent No.: US 6,180,589 B1
(45) Date of Patent: Jan. 30, 2001

(54) POLYETHER HYDROXYCARBOXYLATE COPOLYMERS

(75) Inventors: Klein A. Rodrigues, Signal Mountain; Allen M. Carrier, Hixson, both of TN (US)

(73) Assignee: National Starch and Chemical Investment Holding Corporation, Wilmington, DE (US)

( * ) Notice: Under 35 U.S.C. 154(b), the term of this patent shall be extended for 0 days.

(21) Appl. No.: 09/225,809

(22) Filed: Jan. 5, 1999

(51) Int. Cl.$^7$ .................. C11D 3/37; C08G 63/12
(52) U.S. Cl. .............. 510/479; 510/434; 510/477; 524/779; 524/780; 524/788; 524/791; 528/275; 528/297; 528/298; 528/302; 528/306
(58) Field of Search ................. 510/434, 477, 510/479; 524/779, 780, 788, 791; 528/275, 297, 298, 302, 306

(56) References Cited

U.S. PATENT DOCUMENTS

| | | | |
|---|---|---|---|
| 3,692,685 | 9/1972 | Lamberti et al. | 252/89 |
| 3,769,223 | 10/1973 | Pearson et al. | 252/89 |
| 3,776,850 | 12/1973 | Pearson et al. | 252/89 |
| 4,228,300 | 10/1980 | Lannert | 260/180 |
| 4,240,920 | * 12/1980 | De Luque | 252/99 |
| 4,382,128 | * 5/1983 | Li | 524/513 |
| 4,440,663 | * 4/1984 | Boyer et al. | 252/174.11 |
| 4,654,159 | 3/1987 | Bush et al. | 252/95 |
| 4,734,204 | * 3/1988 | Lamb | 210/708 |
| 4,916,176 | 4/1990 | Amata et al. | 524/401 |
| 5,106,875 | * 4/1992 | Horn et al. | 521/137 |
| 5,484,478 | * 1/1996 | Brothers | 106/696 |
| 5,707,611 | * 1/1998 | Ikemura et al. | 424/53 |
| 5,905,065 | * 5/1999 | Scialla et al. | 510/280 |
| 5,928,384 | * 7/1999 | Scialla et al. | 8/137 |
| 5,980,580 | * 11/1999 | Yamaguchi et al. | 8/137 |

FOREIGN PATENT DOCUMENTS

| | | | |
|---|---|---|---|
| 21620620 | * 9/1972 | (DE) | C08G/23/10 |
| 0 414 228 | 2/1991 | (EP) | C11D/3/37 |
| 49-116024 | 11/1974 | (JP) . | |
| 51-36248 | 10/1976 | (JP) | C07C/59/23 |

* cited by examiner

Primary Examiner—Yogendra Gupta
Assistant Examiner—Brian P. Mruk
(74) Attorney, Agent, or Firm—Thomas F. Roland, Esq.

(57) ABSTRACT

The invention provides novel polyether hydroxycarboxylate copolymers which are effective sequestering agents. The polyether hydroxycarboxylate copolymer when used in a cleaning composition enhances or "builds" the cleaning efficiency of the surfactant by inactivating hardness ions. In addition, the polyether hydroxycarboxylate copolymers assist in cleaning by dispersing and suspending soils to prevent the redeposition of soils. The polyether hydroxycarboxylate copolymer has the structure

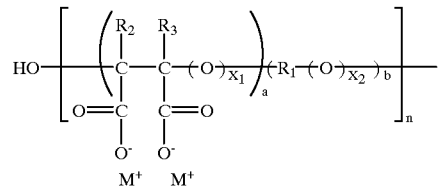

wherein $M^+$ is a cation wherein M is independently selected from hydrogen, ammonia, alkali metals, alkaline earth metals, zinc, copper, organic amines, amino acids, and amino saccharides; $R_2$ and $R_3$ are independently hydrogen or a substituted or unsubstituted alkyl group having 1 to 4 carbon atoms; n is from about 2 to about 100; $x_1$ and $x_2$ are independently 0 or 1; a is from 0 to 99 mole percent; and b is from 100 to 1 mole percent, provided that (a+b) is 100 mole percent.

14 Claims, No Drawings

POLYETHER HYDROXYCARBOXYLATE COPOLYMERS

FIELD OF THE INVENTION

This invention relates to novel polyether hydroxycarboxylate copolymers which are effective sequestering agents. The polyether hydroxycarboxylate copolymer when used in a cleaning composition enhances or "builds" the cleaning efficiency of a surfactant by inactivating hardness ions. The copolymers also assist in cleaning by dispersing and suspending soils to prevent the redeposition of soils onto cleaned articles.

BACKGROUND OF THE INVENTION

The role of sequestering agents in softening water by complexing the "hardness" cations in water supplies is well-known. Sequestering agents are recognized aids in detergent processes because they form a soluble complex with calcium and magnesium ions which can react with soaps and other anionic surfactants and otherwise adversely affect detergency.

Polyphosphates such as tripolyphosphates and pyrophosphates are widely used as ingredients in detergent compositions in part because of their property of sequestering hardness ions. Such phosphorus-containing compounds as well as nitrogen-containing compounds, e.g., nitrilotriacetates, are highly effective. However, the effect of the phosphorus content and the nitrogen content of these sequestering agents upon eutrophication of lakes and streams has been questioned and the use of phosphates in detergent compositions has been subject to government scrutiny, regulation or prohibition.

These circumstances have developed a need for highly effective and efficient phosphorus-free and nitrogen-free sequestering agents and detergency builders.

U.S. Pat. No. 3,692,685, describes detergent compositions containing an ether polycarboxylate having the structure:

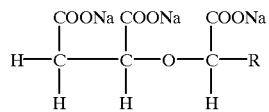

In the above structure of U.S. Pat. No. 3,692,685, R is H or —$CH_2COONa$.

U.S. Pat. No. 4,228,300, describes ether polycarboxylate sequestering agents and detergency builders having the structure:

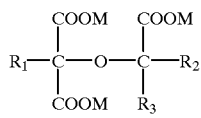

In the above structure of U.S. Pat. No. 4,228,300, M is alkali metal or ammonium, $R_1$ and $R_2$ are hydrogen, methyl or ethyl and $R_3$ is hydrogen, methyl, ethyl or COOM.

U.S. Pat. No. 3,769,223, describes 1-oxacyclopropane-2,3-dicarboxylic acid (i.e., epoxysuccinic acid) and its soluble salts as detergent builders.

U.S. Pat. No. 3,776,850, describes polymers to be used as detergent builders which have the structure:

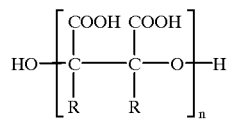

In the above structure of U.S. Pat. No. 3,776,850, R is hydrogen or other specified radicals and n is from 2 to about 40, preferably from 2 to about 6. The polymers are prepared by polymerization of the diethyl ester of 1-oxacyclopropane-2,3-dicarboxylic acid (i.e., epoxysuccinic acid) in the presence of a boron trifluoride catalyst followed by saponification. Detergent compositions are exemplified in which n is said to have an average value of approximately 3 or 4. In fact, the disclosed synthesis method yields mixtures of materials which contain very low levels of the n=3 and n=4 components.

U.S. Pat. No. 4,654,159 describes the use of polyepoxy succinic acid as a sequestering agent in detergent compositions.

SUMMARY OF THE INVENTION

The invention provides a novel polyether hydroxycarboxylate copolymer comprising

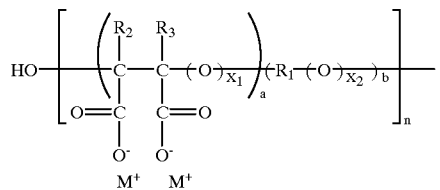

wherein $M^+$ is a cation wherein M is independently selected from the group consisting of hydrogen, ammonia, alkali metals, alkaline earth metals, zinc, copper, organic amines, amino acids, and amino saccharides; $R_1$ is the residue of an ethylenically unsaturated comonomer having at least one functional group which is selected from the group consisting of carboxylic acid, sulfonic acid and phosphonic acid; $R_2$ and $R_3$ are independently selected from the group consisting of hydrogen, and a substituted or unsubstituted alkyl group having 1 to 4 carbon atoms; n is from about 2 to about 100; $x_1$ and $x_2$ are independently 0 or 1; a is from 0 to 99 mole percent; and b is from 100 to 1 mole percent, provided that (a+b) is 100 mole percent.

According to another aspect the invention also provides a cleaning composition comprising from about 0.5 to about 98 weight percent, based on the weight of the cleaning composition, of the polyether hydroxycarboxylate copolymer.

In a cleaning composition, the polyether hydroxycarboxylate copolymer enhances or "builds" the cleaning efficiency of a surfactant by inactivating hardness ions such as calcium and magnesium, and other metal ions such as iron. The polyether hydroxycarboxylate copolymers soften water by sequestration. In addition, the polyether hydroxycarboxylate copolymers assist in cleaning by dispersing and suspending soils to prevent the redeposition of soils onto cleaned articles.

DESCRIPTION OF THE INVENTION

The polyether hydroxycarboxylate copolymers have the structure

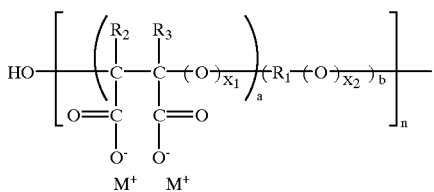

wherein $M^+$ is a cation wherein M is independently selected from the group consisting of hydrogen, ammonia, alkali metals, alkaline earth metals, zinc, copper, organic amines, amino acids, and amino saccharides. Preferably the cation is independently hydrogen or sodium.

In the above structure for the polyether hydroxycarboxylate copolymer, $R_2$ and $R_3$ are independently selected from the group consisting of hydrogen, an alkyl group having 1 to 4 carbon atoms, a substituted alkyl group having 1 to 4 carbon atoms, and combinations thereof. When $R_2$ and $R_3$ are hydrogen, the monomer used to prepare the repeating unit (a) is maleic acid. However, methylmaleic acid (citraconic acid) and other substituted cisbutenedioic acids can be substituted for maleic acid.

In the above structure for the polyether hydroxycarboxylate copolymer, $R_1$ is the residue of an ethylenically unsaturated comonomer having at least one functional group which is selected from the group consisting of carboxylic acid, sulfonic acid and phosphonic acid. Suitable ethylenically unsaturated comonomers having a carboxylic acid functional group are acrylic acid, methacrylic acid, itaconic acid, ethacrylic acid, alpha-chloro-acrylic acid, alpha cyano acrylic acid, crotonic acid, alpha phenyl acrylic acid, beta acryloxy propionic acid, sorbic acid, angelic acid, cinnamic acid, glutaconic acid, 2-acrylamido glycolic acid, and tricarboxyethylene. A preferred ethylenically unsaturated comonomer having carboxylic acid functional groups is itaconic acid.

Suitable ethylenically unsaturated comonomers having a sulfonic acid or phosphonic acid functional group are vinyl sulfonic acid, sodium methallyl sulfonate, 2-acrylamido 2 methyl propane sulfonic acid, allyloxybenzene sulfonic acid, and vinyl phosphonic acid. Preferred ethylenically unsaturated comonomers having a sulfonic acid or phosphonic acid functional group are vinyl sulfonic acid and vinyl phosphonic acid.

Thus, the polyether hydroxycarboxylate copolymer is prepared from (a) and (b) repeating units. The (a) repeat units are derived from either maleic acid, methylmaleic acid, or other substituted cisbutenedioic acids. The (b) repeat units are derived from an ethylenically unsaturated comonomer having at least one functional group which is selected from the group consisting of carboxylic acid, sulfonic acid and phosphonic acid.

In the above structure for the polyether hydroxycarboxylate copolymer, n is from about 2 to about 100. Preferably n is from about 2 to about 20, more preferably from 2 to 10. The letters $x_1$ and $x_2$ are independently 0 or 1. The letter a is from 0 to 99 mole percent, preferably 20 to 99 mole percent. The letter b is from 1 to 100 mole percent, preferably 1 to 80 mole percent, provided that (a+b) is 100 mole percent.

A preferred process for preparing the polyether hydroxycarboxylate copolymers involves mixing the monomer(s) responsible for repeating unit (a) and comonomer(s) responsible for repeating unit (b) together with water to form a mixture. The monomer(s) and comonomer(s) in the mixture are neutralized or partially neutralized using a base. A preferred base is sodium hydroxide. Preferably, at least 60% of the total acid groups are neutralized.

The next step involves epoxidation of the ethylenically unsaturated double bonds present in the monomer(s) and comonomer(s) to form a mixture of epoxides. Methods for epoxidation are well known in the art, such as described by G. B. Payne and P. H. Williams in the Journal of Organic Chemistry, vol. 24, p. 54 (1959) which is incorporated herein by reference. For example, a combination of an oxidizer such as hydrogen peroxide and a catalyst such as sodium tungstate may be used. It is within the scope of the invention that not all of the ethylenically unsaturated double bonds present in the monomer(s) and comonomer(s) are epoxidized. Optionally, the neutralization step or partial neutralization may be carried out after forming the epoxides.

The epoxides are polymerized by means of an anionic polymerization process to form the polyether hydroxycarboxylate copolymer product. Any monomer(s) and/or comonomer(s) which have not been epoxidized may be polymerized such that either $x_1$, $x_2$, or both are equal to 0 in the polyether hydroxycarboxylate copolymer product. Preferably, $x_1$ and $x_2$ are equal to 1 in the polyether hydroxycarboxylate copolymer. The polymerization is conducted in the presence of calcium hydroxide or other alkaline calcium salts. A description of a method for polymerizing an epoxide derived from maleic acid is included in U.S. Pat. No. 4,654,159 which is incorporated herein by reference.

The polyether hydroxycarboxylate copolymer product containing sodium and calcium salts can be used in the form of an aqueous solution. Alternatively, the sodium or calcium salts may be replaced by means of ion exchange by an alkali metal, such as sodium, or by ammonium, substituted ammonium, or hydrogen. Optional removal of low molecular weight components (n=1) may be carried out using a suitable process such as vacuum distillation.

In one embodiment of the invention, the process can be represented as follows:

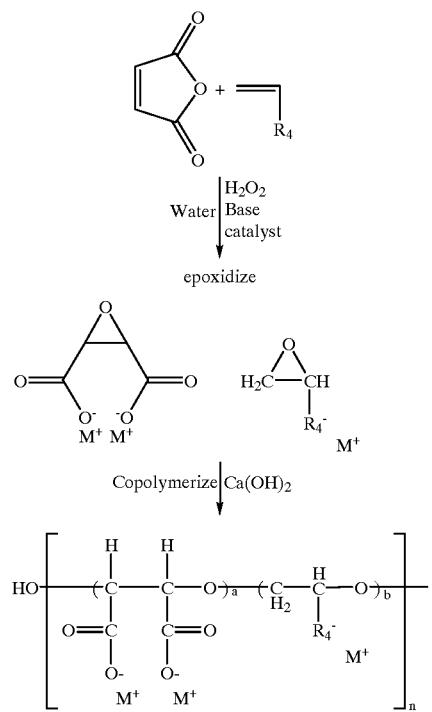

wherein $CH_2CHR_4$ is an ethylenically unsaturated comonomer containing carboxylic acid, phosphonic acid, sulfonic acid group or a combination thereof.

The concentration of the polyether hydroxycarboxylate copolymer in a cleaning composition is from about 0.5 to about 98 weight percent, based on the weight of the cleaning composition, Preferably the polyether hydroxycarboxylate copolymers are present in an amount of from about 1 to about 20 weight percent, more preferably 1 to 10 weight percent, based on the weight of the cleaning composition.

The polyether hydroxycarboxylate copolymer may be used in any cleaning composition. Examples of cleaning compositions containing the polyether hydroxycarboxylate copolymers are laundry detergents, prespotters, dishwashing detergents, and hard surface cleaners. Examples of articles which may be cleaned using the cleaning compositions are fabrics, such as clothing, linens, carpets, or upholstery; hard surfaces such as countertops, windows, floors, dishes, glasses or tiles; or automobiles.

The cleaning composition may be a solid or liquid composition. If the cleaning composition is solid, the cleaning composition may be in any of the usual physical forms, such as for example, powders, beads, flakes, bars, tablets, noodles, pastes, and slurries. If the cleaning composition is liquid, the cleaning composition preferably disperses or solubilizes the polyether hydroxycarboxylate copolymer. The cleaning composition may be aqueous or nonaqueous. For example, the polyether hydroxycarboxylate copolymer may be dissolved or dispersed in water, in one or more solvents or inert diluents. Preferably the cleaning composition is aqueous.

The cleaning compositions may contain any additional components which are used in cleaning compositions. Such additional components are well known to those skilled in the art and include one or more surfactants, builders, ion exchangers, alkalies, anticorrosion materials, antiredeposition materials, optical brighteners, fragrances, dyes, chelating agents, enzymes, whiteners, brighteners, antistatic agents, sudsing control agents, solvents, hydrotropes, bleaching agents, perfumes, bleach precursors, water, buffering agents, soil removal agents, soil release agents, softening agents, opacifiers, inert diluents, buffering agents, corrosion inhibitors, graying inhibitors, anti-redeposition agents, stabilizers, opacifiers, fillers, builders, phosphate co-builder, and phosphate-replacer builder. Combinations of such additional components may also be used.

Preferably cleaning compositions prepared using the polyether hydroxycarboxylate copolymers contain at least one surfactant. Suitable surfactants include nonionic, anionic, cationic, and amphoteric surfactants. The surfactants usable in the cleaning composition may also be soaps.

Anionic surfactants include, for example, from $C_8$ to $C_{12}$ alkylbenzenesulfonates, from $C_{12}$ to $C_{16}$ alkanesulfonates, from $C_{12}$ to $C_{16}$ alkylsulfates, from $C_{12}$ to $C_{16}$ alkylsulfosuccinates or from $C_{12}$ to $C_{16}$ sulfated ethoxylated alkanols.

Nonionic surfactants include, for example, from $C_6$ to $C_{12}$ alkylphenol ethoxylates, from $C_{12}$ to $C_{20}$ alkanol alkoxylates, and block copolymers of ethylene oxide and propylene oxide. Optionally, the end groups of polyalkylene oxides can be blocked, whereby the free OH groups of the polyalkylene oxides can be etherified, esterified, acetalized and/or aminated. Another modification consists of reacting the free OH groups of the polyalkylene oxides with isocyanates. The nonionic surfactants also include $C_4$ to $C_{18}$ alkyl glucosides as well as the alkoxylated products obtainable therefrom by alkoxylation, particularly those obtainable by reaction of alkyl glucosides with ethylene oxide.

Cationic surfactants contain hydrophilic functional groups where the charge of the functional groups are positive when dissolved or dispersed in an aqueous solution. Typical cationic surfactants include, for example, amine compounds, oxygen containing amines, and quaternary amine salts.

Amphoteric surfactants contain both acidic and basic hydrophilic groups. Amphoteric surfactants are preferably derivatives of secondary and tertiary amines, derivatives of quaternary ammonium, quaternary phosphonium or tertiary sulfonium compounds. The cationic atom in the quaternary compound can be part of a heterocyclic ring. The amphoteric surfactant preferably contains at least one aliphatic group, containing about 3 to about 18 carbon atoms. At least one aliphatic group preferably contains an anionic water-solubilizing group such as a carboxy, sulfonate, or phosphono.

Generally, anionic surfactants, such as linear alkyl sulfonates (LAS) are preferred for use in solid cleaning compositions containing the polyether hydroxycarboxylate copolymers. Nonionic and anionic surfactant mixtures such as alcohol ethoxylates and LAS are preferred in liquid cleaning compositions containing the polyether hydroxycarboxylate copolymer. The surfactants are optionally present in an amount of from about 0 to about 50 weight percent, preferably from about 2 to about 45 weight percent, and more preferably from about 5 to about 40 weight percent of the cleaning composition.

Examples of builders which may be present in the cleaning composition include, for example, phosphates, such as pyrophophates, polyphosphates, or sodium tripolyphosphate. Further examples are zeolites, sodium carbonate, poly(carboxylic acids), nitriloacetic acid, citric acid, tartaric acid, the salts of the aforesaid acids and the monomeric, oligomeric, or polymeric phosphonates. Combinations of builders may also be used. The builders are optionally present in an amount of from 0 to about 85 weight percent, preferably from about 5 to about 50 weight percent based on the total weight of the cleaning composition.

Liquid cleaning compositions containing the polyether hydroxycarboxylate copolymer can contain up to 80 weight percent water or solvents or combinations thereof. Typical solvents which may be used include oxygen containing solvents such as alcohols, esters, glycol, and glycol ethers. Alcohols that may be used in the cleaning compositions include, for example, methanol, ethanol, isopropanol, and tertiary butanol. Esters which may be used include, for example, amyl acetate, butyl acetate, ethyl acetate, and esters of glycols. Glycols and glycol ethers that are useful as solvents include, for example, ethylene glycol, propylene glycol, and oligomers of ethylene or propylene glycol.

Solid cleaning compositions containing the polyether hydroxycarboxylate copolymer preferably contain up to 60 weight percent of one or more solid inert diluents such as sodium sulfate, sodium chloride, sodium borate, or selected polymers such as polyethylene glycol or propylene glycol.

The cleaning composition may contain 0 to about 50 weight percent of one or more buffering agents. Buffering agents include, for example, one or more alkali metal salts such as silicates, carbonates, or sulfates. Buffering agents also include, for example, organic alkalis such as triethanolamine, monoethanolamine, and triisopropanolamine.

Other additives which optionally may be included in the cleaning compositions especially for detergent compositions are bleaching agents, used in an amount of up to about 30 weight percent, corrosion inhibitors such as silicates used in an amount of up to about 25 weight percent, dye deposition inhibiting agents used in an amount up to about 20 weight percent, and graying inhibitors used in an amount of up to about 5 weight percent.

Suitable bleaching agents are, for example, perborates, percarbonates, or chlorine-generating substances such as chloroisocyanurates. Suitable silicates used as corrosion inhibitors are, for example, sodium silicate, sodium disilicate, and sodium metasilicate. Suitable dye deposition inhibiting agents are, for example, polyvinyl pyrrolidone. Examples of graying inhibitors are, for example, carboxymethylcellulose, methylcellulose, hydroxypropylmethyl-cellulose, and graft copolymers of vinyl acetate and polyalkylene oxides having a molecular weight of 1,000 to 15,000.

In a cleaning composition, the polyether hydroxycarboxylate copolymer enhances or "builds" the cleaning efficiency of a surfactant by inactivating hardness ions such as calcium and magnesium, and other metal ions such as iron. The polyether hydroxycarboxylate copolymers soften water by sequestration. In addition, the polyether hydroxycarboxylate copolymers assist in cleaning by dispersing and suspending soils to prevent the redeposition of soils onto cleaned substrates.

The following nonlimiting examples illustrate further aspects of the invention.

EXAMPLE 1 (COMPARATIVE)

Preparation of a polyepoxy succinic acid.

Maleic anhydride, 22.3 g (0.227 mole) was mixed with 32 g of deionized water. The maleic acid was neutralized by dropwise addition of 29.3 (0.366 mole) of a 50% NaOH solution. The neutralization was carried out under cooling using an ice bath. The mixture was heated to 55° C. and 0.792 g (0.0024 mole) of sodium tungstate dihydrate dissolved in 3 g of deionized water was added. Hydrogen peroxide, 23.1 g (0.238 mole) of a 35% solution, was added to the mixture over a period of 15 to 30 minutes while maintaining a temperature of 55° C. to 65° C. Sodium hydroxide, 7 g of a 50% solution, was added. The reaction temperature was maintained at 60° C. for two hours. Calcium hydroxide, 0.84 g (0.014 mole) was added, and the reaction temperature was increased to 95° C. to 100° C. for three hours to form a polyepoxy succinic acid product that was a slightly cloudy white solution.

EXAMPLE 2

Preparation of a polyether hydroxycarboxylate copolymer containing 10 mole percent itaconic acid as a comonomer.

Maleic anhydride, 20 g (0.204 mole) and 3 g (0.023 mole) of itaconic acid were mixed with 32 g of deionized water. The maleic acid and itaconic acid were neutralized by dropwise addition of 29.3 (0.366 mole) of a 50% NaOH solution. The neutralization was carried out under cooling using an ice bath. The mixture was heated to 55° C. and 0.792 g (0.0024 mole) of sodium tungstate dihydrate dissolved in 3 g of deionized water was added. Hydrogen peroxide, 23.1 g (0.238 mole) of a 35% solution, was added to the mixture over a period of 30 to 60 minutes while maintaining a temperature of 55° C. to 65° C. The reaction mixture was heated at 60° C. for two hours. Sodium hydroxide, 7 g of a 50% solution, was added. The reaction temperature was maintained at 60° C. for two hours. Calcium hydroxide, 0.84 g (0.014 mole) was added, and the reaction temperature was increased to 95° C. to 100° C. for four hours to form a copolymer product. The polyether hydroxycarboxylate copolymer product was a clear amber colored solution.

EXAMPLE 3

Preparation of a polyether hydroxycarboxylate copolymer containing 10 mole percent vinyl phosphonic acid as a comonomer.

Maleic anhydride, 20 g (0.204 mole) and 3.12 g of a 80% solution (0.023 mole) of vinyl phosphonic acid (commercially available as ITC 467 from Albright and Wilson) were mixed with 32 g of deionized water. The maleic acid and vinyl phosphonic acid were neutralized by dropwise addition of 28.8 (0.36 mole) of a 50% NaOH solution. The neutralization was carried out under cooling using an ice bath. The mixture was heated to 55° C. and 0.792 g (0.0024 mole) of sodium tungstate dihydrate dissolved in 3 g of deionized water was added. Hydrogen peroxide, 23.1 g (0.238 mole) of a 35% solution, was added to the mixture over a period of 30 to 60 minutes while maintaining a temperature of 55° C. to 65° C. The reaction mixture was heated at 60° C. for two hours. Sodium hydroxide, 7 g of a 50% solution, was added with cooling. The reaction temperature was maintained at 60° C. for two hours. Calcium hydroxide, 0.84 g (0.014 mole) was added, and the reaction temperature was increased to 95° C. to 100° C. for five to six hours to form a copolymer product. The polyether hydroxycarboxylate copolymer product was a slightly opaque white solution.

EXAMPLE 4

Preparation of a polyether hydroxycarboxylate copolymer containing 7.5 mole percent itaconic acid as a comonomer.

Maleic anhydride, 20.6 g (0.2099 mole) and 2.2 g (0.017 mole) of itaconic acid were mixed with 33.5 g of deionized water. The mixture was heated to 60 C. to form a clear homogenous solution. Sodium tungstate dihydrate 1.089g (0.0033 mol) dissolved in 4.0 g of DI water was then added. The reaction mixture turned yellow in color. Hydrogen peroxide, 27.6 g (0.284 mole) of a 35% solution, was added to the mixture over a period of 30 to 60 minutes while maintaining a temperature of 55° C. to 65° C. The reaction mixture turned a clear water white color and was heated at 60° C. for three to four hours. Sodium hydroxide 32.7 g (0.408 moles) was added to the reaction over 30 to 60 minutes while maintaining a temperature of 60 to 70 C. The reaction was then held at 60 C. for 4 to 5 hours. The reaction mixture was cooled down to room temperature. Sodium hydroxide, 2.3 g (0.045 mol) of a 50% solution, was added to complete the neutralization. Calcium hydroxide, 1.3 g (0.022 mole) was added, and the reaction temperature was increased to 95° C. to 100° C. for seven to eight hours to form a copolymer product. The polyether hydroxycarboxylate copolymer product was a clear light yellow solution.

EXAMPLE 5

Calcium binding properties.

The calcium binding properties of the polyepoxy succinic acid polymer prepared in Example 1 and the polyether hydroxycarboxylate copolymers prepared in Examples 2–4 were evaluated in a Hampshire Binding test. The Hampshire Binding test procedure was as follows:

(1) Prepare a 0.25 M calcium acetate solution.

(2) Prepare a 2 weight percent polymer solution based on solids of each of the polyepoxy succinic acid polymer prepared in Example 1 and the polyether hydroxycarboxylate copolymers prepared in Examples 2–4.

(3) Prepare a 2 weight percent sodium carbonate solution.

(4) Mix 50 grams of the polymer and copolymer solutions with 10 ml of the sodium carbonate solution. Dilute with deionized water up to 100 ml.

(5) Titrate the mixture prepared in Step 4 with the 0.25 M calcium acetate solution until the mixture remains cloudy.

TABLE I

| Polymer/Copolymer | Calcium binding mg CaCO$_3$/g polymer |
| --- | --- |
| Polyepoxy succinic acid of Example 1 | 65 |
| Polyether carboxylate with 10 mole % itaconic acid of Example 2 | 208 |
| Polyether carboxylate with 10 mole % vinyl phosphonic acid of Example 3 | 206 |
| Polyether carboxylate with 7.5 mole % itaconic acid of Example 4 | 219 |

The data in Table I indicates that the polyether carboxylate copolymers of the invention have superior calcium binding properties as compared to poly epoxy succinic acid.

EXAMPLE 6

Evaluation of anti-redeposition properties.

The polyepoxy succinic acid polymer prepared in Example 1 and the polyether hydroxycarboxylate copolymers prepared in Examples 2–4 were evaluated for antiredeposition properties. The anti-redeposition test was conducted in a terg-o-tometer using three 4×4.5" cotton swatches and three 4×4.5" EMPA 213 (polycotton swatches available from Test Fabrics). Five 4×4" polycotton swatches were used as ballast. The wash cycle was 10 minutes using 0.9 g/L of UNBUILT liquid detergent (composition listed below) and 150 ppm hardness water with a Ca to Mg ratio of 2:1. The soil used was 0.3 g/L rose clay, 0.16 g/L bandy black clay and 0.9 g/L of an oil blend (70% vegetable oil and 30% mineral oil). The polymer and copolymers were dosed at 4 weight percent of the detergent weight. The rinse cycle was 3 minutes using 150 ppm hardness water with a Ca to Mg ratio of 2:1. A total of 3 cycles were carried out and the swatches were dried in a tumble dryer on medium setting. The L a b values before the first cycle and after the third cycle was measured as $L_1$, $a_1$, $b_1$ and $L_2$, $a_2$, $b_2$ respectively.

$$\Delta E = [(L_1 - L_2)^2 + (a_1 - a_2)^2 + (b_1 - b_2)^2]^{0.5}$$

The UNBUILT liquid detergent contained 22.5 weight percent NEODOL 25-7, 18.8 weight percent BIOSOFT D40, 3 weight percent triethanol amine, 5 weight percent ethanol, 2 weight percent potassium chloride, and 48.8 weight percent water. NEODOL 25-7 is an alcohol ethoxylate containing $C_{12}$–$C_{15}$ alcohol with 7 moles of ethoxylation, available from Shell Chemical Co. BIOSOFT D40 is sodium dodecylbenzene sulfonate, available from Stepan Chemical Co. The test results are summarized in Table II.

TABLE II

| | Anti-Redeposition Test | | | |
| --- | --- | --- | --- | --- |
| Polymer/Copolymer | ΔE for cotton | Ave ΔE for cotton | Ave ΔE for polycotton | Ave ΔE for polycotton |
| Blank | 5.0 | | 3.6 | |
| | 5.1 | 5.2 | 3.3 | 3.4 |
| | 5.6 | | 3.4 | |
| Polymer of Example 1 | 5.9 | | 4.3 | |
| | 6.7 | 6.3 | 4.0 | 4.4 |
| | 6.3 | | 4.8 | |
| Copolymer of Example 2 | 2.6 | | 2.2 | |
| | 2.7 | 2.8 | 2.4 | 2.4 |
| | 3.0 | | 2.5 | |
| Copolymer of Example 3 | 3.8 | | 2.8 | |
| | 3.1 | 3.4 | 3.0 | 2.8 |
| | 3.3 | | 2.7 | |
| Copolymer of Example 4 | 3.3 | | 3.3 | |
| | 3.0 | 3.2 | 2.8 | 2.9 |
| | 3.2 | | 2.6 | |

The test results in Table II clearly show that the polyether hydroxycarboxylate copolymers of the invention have superior anti-redeposition properties as compared to poly epoxy succinic acid.

EXAMPLE 7

Evaluation of polymers as Iron Chelation in alkaline conditions.

The polyepoxy succinic acid polymer prepared in Example 1 and the polyether hydroxycarboxylate copolymer containing 10 mole percent itaconic acid prepared in Example 2 were evaluated for their ability to chelate calcium under alkaline conditions. The performance of the polymer and copolymer were compared against disodium ethylene diamine tetra acetate (Versene 100) which is a typical chelating agent.

Three individual solutions were prepared containing 5 g of the test polymer or copolymer in 500 g of deionized water. The solutions were stirred by means of a magnetic stir plate and the pH of the solutions was adjusted to 12.0+−0.1 by addition of a 50% sodium hydroxide solution. 5 ml of 0.1 M ferric chloride solution was added at room temperature (25 C.) to each solution. The stirring was maintained for 5 minutes. The solutions were removed from the magnetic stir plate and observed after two minutes for presence of a brown precipitate of ferric hydroxide which will not dissolve. If a precipitate is present, the test is stopped. If a precipitate is not present, the solutions were placed back on the stir plate and 5 ml of 0.1 M ferric chloride solution was added and the pH adjusted to 12.0+−0.1 by addition of a 50% sodium hydroxide solution. The temperature and stirring are maintained for 5 minutes. The solutions are removed from the stir plate and observed after two minutes for presence of brown precipitate. This procedure was repeated until the precipitate appeared.

The number of mls of 0.1 M FeCl$_3$ required to form a precipitate is recorded. Subtract 5 ml from last titration to get mls. For example, if precipitate is first noticed after 40 ml FeCl$_3$, record the iron chelating capacity (FeCV) as 35 ml FeCl$_3$). If precipitate is present after $1^{st}$ 5 ml, the chelate has no iron chelation value per this test. The test results are summarized in Table III.

TABLE III

Iron Chelating Test

| Polymer/Copolymer | Iron Chelating Capacity (ml of 0.1M FeCl₃ used in Titration) |
| --- | --- |
| Polymer of Example 1 | 20 |
| Copolymer of Example 2 | >50 |
| EDTA (Versene 100) | 5 |

The test results in Table III clearly show that the polyether hydroxycarboxylate copolymer of Example 2 effectively chelates iron in highly alkaline systems while EDTA was not effective as a processing aid under such alkaline conditions. Moreover, the test results in Table III show that the polyether hydroxycarboxylate copolymers of the invention are superior chelating agents as compared to polyepoxy succinic acid polymers. While not wishing to be bound by any particular theory, the present inventors believe that the copolymers of the invention are effective chelating agents because they formed a stable chelate with ferric ions and delayed the formation of a brown precipitate of ferric hydroxide.

EXAMPLE 8

Preparation of a polyether hydroxycarboxylate copolymer containing 100 mole percent acrylic acid as a comonomer.

Acrylic acid, 36.0 g (0.5 mole) was mixed with 25.0 g of deionized water. Sodium tungstate dihydrate 2.36 g (0.0071 mol) dissolved in 6.0 g of deionized water was then added. The reaction mixture turned in to an opaque white solution. Hydrogen peroxide, 60.7 g (0.625 mole) of a 35% solution, was added to the mixture over a period of 1 to 2 hours while maintaining the reaction at a temperature of 20° C. to 30° C. The reaction mixture turned a clear light yellow color and was heated at 60° C. for five hours. The reaction mixture was cooled down to room temperature. Sodium hydroxide, 30.0 g (0.375) of a 50% solution, was added to over 30 to 60 minutes to partially neutralize the acrylic acid to 75 mole percent. The reaction mixture was then heated at 60° C. for 8 to 10 hours. The reaction was then cooled to room temperature and 6.5 g of a 50% solution of sodium hydroxide (0.08125 mole) was added. Calcium hydroxide, 3.08 (0.0416 mole) was added, and the reaction temperature was increased to 95° C. to 100° C. for seven to eight hours to form a copolymer product. The polyether hydroxycarboxylate copolymer product was a opaque white solution which was neutralized with 3.0 g of citric acid (0.0156 mole) to lower the pH to 10.

While the invention has been described with particular reference to certain embodiments thereof, it will be understood that changes and modifications may be made by those of ordinary skill in the art within the scope and spirit of the following claims.

What is claimed is:

1. A polyether hydroxycarboxylate copolymer comprising

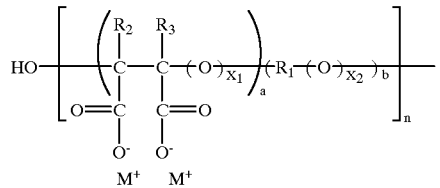

wherein $M^+$ is a cation having a +1 charge, or $M^+$ is a $(M^{+2})_{1/2}$, wherein M is independently selected from the group consisting of hydrogen, ammonia, alkali metals, alkaline earth metals, zinc, copper, organic amines, amino acids, and amino saccharides; $R_1$ is the residue of an ethylenically unsaturated comonomer having at least one functional group which is selected from the group consisting of carboxylic acid, sulfonic acid and phosphonic acid; $R_2$ and $R_3$ are independently selected from the group consisting of hydrogen, and a substituted or unsubstituted alkyl group having 1 to 4 carbon atoms; n is from about 2 to about 100: $x_1$ and $x_2$ are 1; a is from 1 to 99 mole percent; and b is from 99 to 1 mole percent, provided that (a+b) is 100 mole percent.

2. The polyether hydroxycarboxylate copolymer according to claim 1 wherein the copolymer is prepared from maleic acid and itaconic acid.

3. The polyether hydroxycarboxylate copolymer according to claim 1 wherein the copolymer is prepared from maleic acid and vinyl phosphonic acid.

4. The polyether hydroxycarboxylate copolymer according to claim 1 wherein the copolymer is prepared from maleic acid and malonic acid.

5. The polyether hydroxycarboxylate copolymer according to claim 1 wherein n is from about 2 to about 20.

6. The polyether hydroxycarboxylate copolymer according to claim 1 wherein the letter a is from 20 to 99 mole percent, and the letter b is from 1 to 80 mole percent, provided that (a+b) is 100 mole percent.

7. The polyether hydroxycarboxylate copolymer according to claim 1 wherein M is an alkali metal.

8. The polyether hydroxycarboxylate copolymer according to claim 1 wherein $R_2$ and $R_3$ are hydrogen.

9. The polyether hydroxycarboxylate copolymer according to claim 1 wherein the letter a is from 20 to 99 mole percent, and the letter b is from 1 to 80 mole percent.

10. A cleaning composition comprising at least one surfactant and from about 0.5 to about 98 weight percent, based on the weight of the cleaning composition, of a polyether hydroxycarboxylate copolymer having the structure

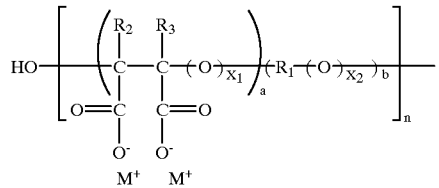

wherein the polyether hydroxycarboxylate copolymer enhances the cleaning efficiency of the surfactant by inactivating hardness ions, and wherein $M^+$ is a cation having a +1 charge, or $M^+$ is a $(M^{+2})_{1/2}$, wherein M is independently selected from the group consisting of hydrogen, ammonia, alkali metals, alkaline earth metals, zinc, copper, organic amines, amino acids, and amino saccharides; $R_1$ is the residue of an ethylenically unsaturated comonomer having at least one functional group which is selected from the group consisting of carboxylic acid, sulfonic acid and phosphonic acid; $R_2$ and $R_3$ are independently selected from the group consisting of hydrogen, and a substituted or unsubstituted alkyl group having 1 to 4 carbon atoms; n is from about 2 to about 100: $x_1$ and $x_2$ are 1; a is from 1 to 99 mole percent; and b is from 99 to 1 mole percent, provided that (a+b) is 100 mole percent.

11. The cleaning composition according to claim 10 wherein the polyether hydroxycarboxylate copolymer is present in an amount of from about 1 to about 20 weight percent.

12. The cleaning composition according to claim 11 wherein the polyether hydroxycarboxylate copolymer is present in an amount of from about 1 to about 10 weight percent.

13. A method of cleaning comprising preparing a cleaning composition comprising at least one surfactant and the polyether hydroxycarboxylate copolymer according to claim 1, contacting the cleaning composition with one or more articles, wherein at least one of the articles contains soil, and removing at least a portion of the soil from the article containing soil, wherein the polyether hydroxycarboxylate copolymer disperses and suspends soils to prevent the redeposition of soils onto the cleaned articles.

14. The method of cleaning according to claim 13 wherein the cleaning composition further comprises at least one additive selected from the group consisting of builders, surfactants, ion exchangers, alkalies, anticorrosion materials, antiredeposition materials, antistatic agents, optical brighteners, perfumes, fragrances, dyes, fillers, chelating agents, enzymes, fabric whiteners, brighteners, sudsing control agents, solvents, hydrotropes, bleaching agents, bleach precursors, buffering agents, soil removal agents, soil release agents, fabric softening agent, and opacifiers.

* * * * *